United States Patent

Bachmann et al.

[11] Patent Number: 5,889,460
[45] Date of Patent: Mar. 30, 1999

[54] ELECTRIC RESISTANCE TEMPERATURE SENSOR

[75] Inventors: Volker Bachmann, Bretton-Buchig; Lutz Ose, Sternenfels, both of Germany

[73] Assignee: E.G.O. Elektro-Gerätebau GmbH, Germany

[21] Appl. No.: 865,955

[22] Filed: May 30, 1997

[30] Foreign Application Priority Data

May 30, 1996 [DE] Germany ................. 196 21 689.3

[51] Int. Cl.$^6$ ................................ H01C 7/10
[52] U.S. Cl. ................ 338/28; 338/22 R; 338/25; 338/30; 338/238
[58] Field of Search ............ 338/22 R, 22 SD, 338/25, 26, 28, 29, 30, 238

[56] References Cited

U.S. PATENT DOCUMENTS

| | | |
|---|---|---|
| 3,195,093 | 7/1965 | Dillon .................... 338/273 |
| 3,723,935 | 3/1973 | Frazier et al. . |
| 4,398,169 | 8/1983 | Hayashi ................... 338/25 |
| 4,977,385 | 12/1990 | McQueen ................. 338/24 |
| 5,071,258 | 12/1991 | Usher et al. ............. 374/140 |
| 5,093,555 | 3/1992 | Dupuis et al. ........... 219/270 |
| 5,142,266 | 8/1992 | Friese et al. . |
| 5,309,133 | 5/1994 | Berger et al. ............ 338/22 |

FOREIGN PATENT DOCUMENTS

| | | |
|---|---|---|
| 0 498 386 A1 | 2/1992 | European Pat. Off. . |
| 275 311 A1 | 9/1988 | Germany . |
| 43 30 447 A1 | 9/1993 | Germany . |
| 58-01 7327 A | 2/1983 | Japan . |
| 0616 0332 A1 | 6/1994 | Japan . |

OTHER PUBLICATIONS

Patent Abstracts of Japan, Publication No.: 07005050 A, Jan. 10, 1995, in English.

*Primary Examiner*—Michael L. Gellner
*Assistant Examiner*—Karl Easthom
*Attorney, Agent, or Firm*—Quarles & Brady

[57] ABSTRACT

An electrical resistance temperature sensor (11) contained in a stainless steel, tubular jacket (12), which has a very small diameter of approximately 1 mm, a platinum resistance coil (18) running between two joining bolts (14, 19). The resistance coil with a positive temperature characteristic of the resistance is placed in an embedding medium (17), which comprises a mixture of magnesium oxide or aluminium oxide and cerium dioxide.

For use as an integrating temperature sensor for a catalytic converter, said adequately flexible temperature sensor can be wound into a roll of smooth and corrugated metal sheets and fixed by soldering in vacuo.

18 Claims, 2 Drawing Sheets

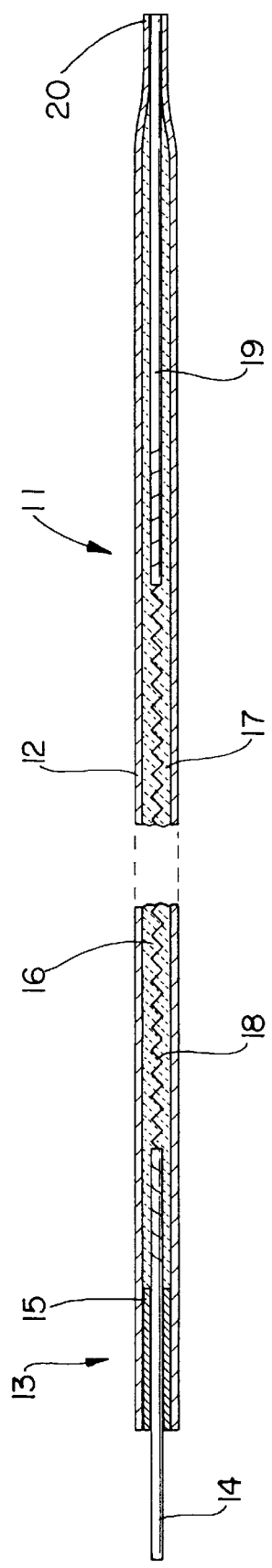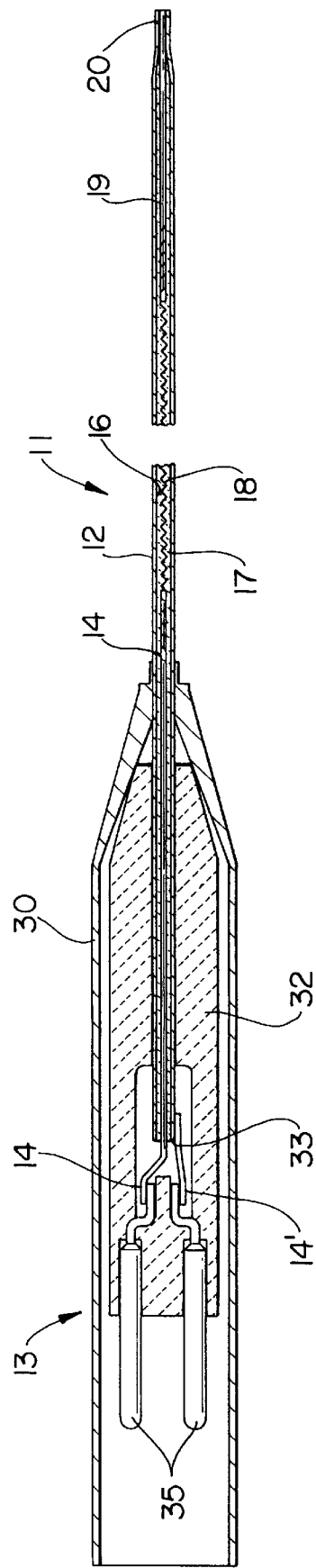
FIG. 1
FIG. 2

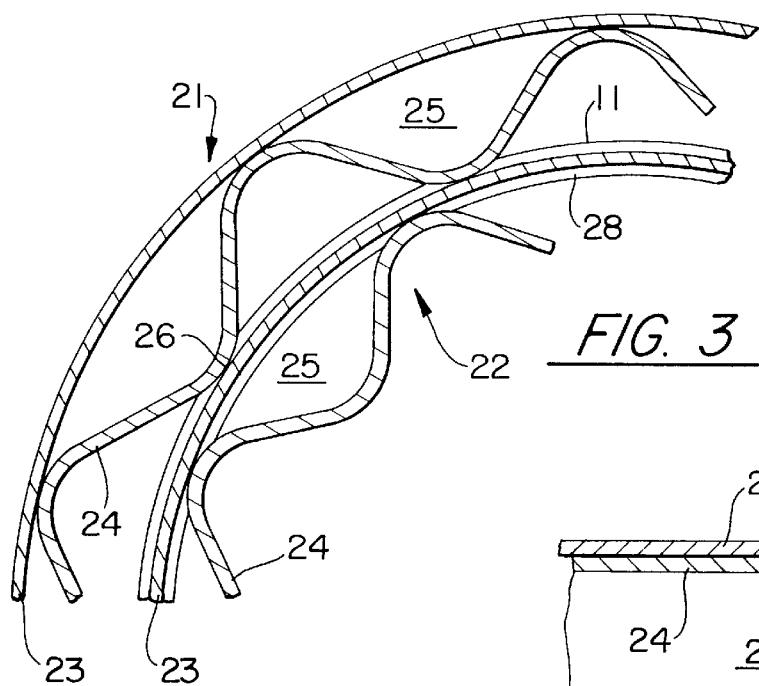
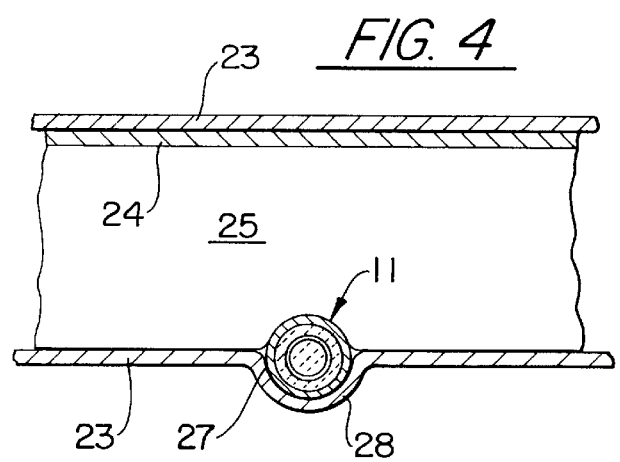
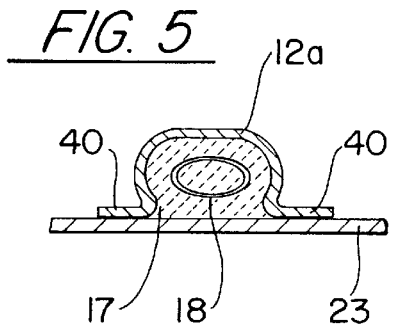
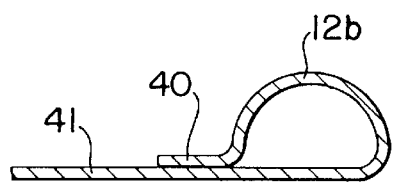
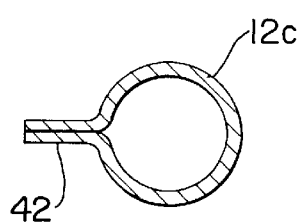
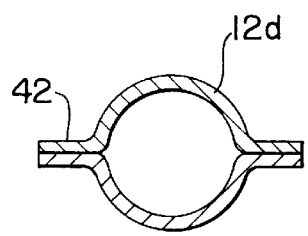

ELECTRIC RESISTANCE TEMPERATURE SENSOR

FIELD OF USE AND PRIOR ART

The invention relates to an electric resistance temperature sensor, such as is used for measuring the temperature on measurement objects for display, recording, regulation or control purposes in conjunction with suitable measuring or control equipment. The temperature sensor is particularly intended for use at high temperatures up to 1500 K.

EP 498 386 B discloses a temperature sensor with a stainless steel casing or jacket, in which, in a pulverulent, compacted, electrically insulated embedding medium or encapsulant, is located a helical resistance wire. The latter is made from an iron-based alloy and can have a positive temperature coefficient of the electric resistance, so as in this way to permit a temperature measurement. A mineral insulating material such as magnesium oxide (MgO) is used as the embedding medium.

The temperature sensor is made from a tube filled with the coil and the embedding medium, in which there is subsequently a cross-sectional reduction of the jacket in order to compress or mould the embedding medium.

PROBLEM AND SOLUTION

The problem of the invention is to improve a temperature sensor of the above-described type with respect to a high thermal stability, accompanied by a uniform dependence of the resistance on the temperature.

This problem is solved by the invention.

Through the use of a noble metal, particularly platinum or a similar alloy, the temperature sensor can maintain a substantially linear characteristic between the temperature and resistance over a very wide temperature range and also in the case of high temperatures. The temperature coefficient is more than 0.03 [1/K].

However, it is pointed out that under the action of higher temperatures (>550° C.), either during manufacture or during use, the usually helical platinum resistance wire dissolves or decomposes and consequently there is an irreversible change to its resistance characteristics. It has been found that this is due to the fact that the platinum with the embedding medium, which can comprise magnesium oxide, aluminium oxide, etc., reacts, particularly in the case of a low-oxygen atmosphere, which can in particular occur during manufacture, e.g. during soldering processes and the like, which are often performed in vacuo and/or occurs due to the desired formation of an oxide coating on the inner wall of the jacket.

It has also been found that this can be obviated by using cerium dioxide ($CeO_2$) as the embedding medium. However, during measurements this revealed undesired variations from the resistance/temperature curve of the sensor. However, it was established according to the invention that these variations with respect to the temperature curve no longer occurred on adding to the embedding medium, comprising a conventional high temperature-resistant bulk insulating material such as magnesium oxide or aluminium oxide, only a cerium dioxide proportion, i.e. by using a mixture of cerium dioxide and other insulating materials.

Tests have revealed that cerium dioxide, particularly in the case of small tubular heater dimensions and correspondingly thin insulating layers between the resistance coil and the jacket, becomes conductive at higher temperatures. Thus, the measurement is falsified by leakage currents superimposed on the measurement currents. However, it has been found that this disadvantage of cerium dioxide does not occur, if it is admixed with another insulating material, although it can still exert its platinum-protecting action. The action of the cerium dioxide can probably be explained by the fact that the oxygen, required by the platinum at high temperatures, is liberated again when the temperature is reduced and is then reabsorbed by the cerium dioxide. Thus, there is a bilateral, reversible oxygen exchange. Thus, the cerium dioxide action can be explained in that an oxygen atmosphere, which is required at high temperatures in order to prevent an irreversible reaction of the platinum with the base constituents of the insulating material is produced. When the temperature drops oxygen is again absorbed by the cerium dioxide, which largely comes from the atmosphere in the interior of the sensor.

It has been found that even a relatively small admixture as from approximately 1% can be sufficient for the platinum-protecting action of the cerium dioxide, namely the property of giving off oxygen in a reversible manner at higher temperatures. However, preference is given to 5 to 35% and particularly favourable results have been obtained with 16% cerium dioxide in the insulating material. This is a function of the dimensions of the temperature sensor and the temperature conditions, as well as further requirements, such as e.g. the air seal in the temperature sensor, etc. Thus, e.g. with relatively thick insulating layers, the mixture can also contain a relatively high cerium dioxide percentage of e.g. 70%.

A particularly important field of use for the temperature sensor is in the control of catalytic converters. In the case of the latter up to now temperature measurements have only been performed in punctiform manner, in order to control the processes upstream of the catalyst, or a control has taken place by measuring the exhaust composition. In the case of the temperature sensor according to the invention, which can be produced with a relatively great length and small cross-sectional dimensions, it is possible to carry out an integral measurement with catalytic converters or similar measurement objects. Thus, e.g. a correspondingly flexible temperature sensor can be "rolled in" to the catalyst material, which normally comprises alternating layers of corrugated and smooth metal sheeting, which is wound together to a roll through which a flow occurs in the axial direction.

In order to permit this, the jacket tube should have small cross-sectional dimensions of e.g. diameter approximately 1 mm, the yield strength should be between $600N/mm^2$ and $900N/mm^2$, preferably $700N/mm^2$ and the jacket material hardness should not exceed 350 Vickers (HV) and should preferably be 180 HV. This presupposes a corresponding material selection, particularly because the material is usually very hard due to the deformation processes after tube filling. The jacket tube should correspondingly comprise a FeCrAl tube and preferably a longitudinally seam welded, drawn tube. Based on iron, it can contain 10 to 25% chromium, 4 to 6% aluminium and other low percentage alloying constituents such as yttrium, manganese, nickel, titanium and zinc.

In a typical construction, the jacket is a tube, so that an independent temperature sensor is obtained, which is subsequently joined to the measurement object. However, it is also possible to provide other jacket forms or shapes, e.g. sheet metal pockets independent of the measurement object, whose double web is possibly appropriate for fitting purposes. It is also possible to use components of the measurement object as parts of the jacket, in that e.g. one of the metal sheets used for producing the catalytic converter through the longitudinal welding on of an omega-shaped sheet metal section forms the cavity receiving the resistance wire. Also with a tube construction, the sensor cross-section can diverge from the ideal circular shape and can e.g. be oval, D-shaped or triangular.

Preferably when its connections or terminals are placed on the measurement object, at least to the extent that they contain contact points between different metals, it should be ensured that they are at approximately the same temperature level, so as to exclude or at least minimize measured value falsifications by thermal stresses.

It can help to reduce the necessary cerium dioxide proportion in the embedding medium, if it is ensured that the temperature sensor is sealed in pressure-tight or vacuum-tight manner when, during the manufacture of the measurement object, e.g. a soldering process for the catalytic converter, the temperature sensor is also soldered. This ensures that during this process taking place under a high temperature the residual oxygen in the temperature sensor interior is not sucked out, which would increase the aforementioned problems.

This can take place by welding closed the temperature sensor, which is then intrinsically short-circuited. At the end of manufacture, e.g. by cutting through a sealing sleeve, this hermetic seal can be broken again and simultaneously the temperature sensor is again rendered electrically functional. Where a joining bolt passes out of the temperature sensor jacket there is admittedly a seal, e.g. due to an insulating bead and a moisture-tight seal is ensured at this point e.g. by a corresponding silicone impregnation of the embedding medium, but over a period of time there can be an undesired oxygen penetration here.

The temperature sensor preferably has a rod-like construction. In this case it is appropriate to lead the resistance wire coil from a joining bolt projecting and insulated from the jacket tube to a connection on the free end of the sensor and to contact it there, by means of a joining bolt, with the jacket which forms the return conductor. However, it is also possible to contact the resistance wire with joining bolts passing on both sides and in insulated manner out of the jacket, the temperature sensor being e.g. bent in U-shaped or hairpin-like manner.

These and further features can be gathered from the claims, description and drawings, the individual features, either singly or in the form of subcombinations, being implementable in an embodiment of the invention and in other fields and can represent advantageous, independently protectable constructions for which protection is hereby claimed. The subdivision of the application into individual sections and the intermediate headings in no way limit the general validity of the statements made under them.

BRIEF DESCRIPTION OF THE DRAWINGS

Embodiments of the invention are described in greater detail hereinafter relative to the attached drawings, wherein show:

FIG. 1 A broken away longitudinal section through a temperature sensor.

FIG. 2 A longitudinal section through a temperature sensor variant modified with respect to the connection.

FIG. 3 A detail cross-section through a catalytic converter with the temperature sensor.

FIG. 4 A section along line IV in FIG. 3.

FIG. 5 A cross-section through a temperature sensor integrated into the measurement object.

FIGS. 6 to 8 Variants of the jacket construction for a temperature sensor in cross-section.

DESCRIPTION OF EMBODIMENTS

FIG. 1 shows a temperature sensor 11 with an external, tubular, stainless steel jacket 12 of an iron-chromium-aluminium alloy. Preference is given to an alloy containing 20 to 25% chromium, 4 to 6% aluminium, the remainder being constituted by iron and additions of yttrium, silicon, manganese, nickel, titanium and/or zirconium in concentrations of less than 1%.

In this tube, which has the smallest cross-sectional dimension in the case of a circular tube has a diameter of less than 1.5 mm, preferably 1 mm, is very long and is usually much more than 200 mm long. The jacket 12 is open on the connection side 13, where a joining pin or bolt 14 projects, being preferably made from the same material as the jacket 12. It is guided and terminated at the connection end by means of an insulating bead 15, i.e. of a sleeve surrounding the joining bolt 14 placed in fitting manner in the interior of the jacket 12.

The interior 16 of the jacket 12 is filled with an embedding medium 17 comprising a mixture of at least two different materials. One material in the mixture is a high temperature-resistant, inorganic, electrically insulating material such as magnesium oxide, aluminium oxide (MgO, $Al_2O_3$), etc., which remains physically and chemically largely unchanged at high temperatures and maintains its electrical insulating property. This material is preferably used in the form of an oxide-ceramic powder or bulk material with an average particle size of 2 to 100 $\mu$m (preferably 24 $\mu$m).

The second component of the mixture is a material reversibly giving off oxygen at high temperatures, preferably the reversible oxygen-yielding insulating material cerium dioxide in the form of a powder with an average particle size of 2 to 5 $\mu$m. The $MgO/CeO_2$ mixing ratio is 6:1 parts by weight in the embodiment.

In this embedding medium compacted in a manner to be described hereinafter is centrally contained and positioned a platinum resistance wire coil 18, which is electrically insulated by the embedding medium 17 from the inner wall of the jacket 12. It is electrically conductively fitted, e.g. by welding on the end of the joining bolt 14 projecting into the jacket interior 16. Its opposite end is connected to a corresponding joining bolt 19, which is relatively long and is tightly welded into a spout-like reduced end piece 20 of the jacket. It is also possible to make the joining bolts 14, 19 from the same material as the resistance wire, but this is more expensive due to the platinum. The insulating bead 15 is of oxide ceramic, e.g. of alumina. The sealing of the electrical passage at the connection ends can, if necessary, take place by means of solder glass or soldered metal-ceramic composites, but also can take place by means of silicones.

The temperature sensor according to FIG. 1 is manufactured in the same way as described in EP 498 386 B, to which express reference is made. The resistance wire coil 18 is introduced into the embedding medium in a longitudinally seam-welded, drawn, vacuum-tight high-grade steel tube using a method known from tubular heater manufacture. The still relatively loose embedding medium 17, which has admittedly been precompacted by shaking, is compacted in that the cross-section of the tube is reduced by rolling or other processes and there is simultaneously a length increase. In the present case these shape changes are particularly marked, because the resulting cross-sections are very small. By a corresponding intermediate heat treatment, it is ensured that the hardness of the jacket material remains lower than 350 HV, 160 HV being looked upon as the practical lower limit. Preferably the jacket has approximately 180 HV.

Together with the small diameter, there is a very good flexibility of the temperature sensor without impairing its function. The active temperature sensor length of the resistance wire, which is limited by the inner ends of the joining pins, should be as large as possible and at least 100 mm. This makes it possible to carry out integrating measurements on measurement objects, such as e.g. a catalytic converter 21 (FIG. 3), i.e. measurements supplying a representative, average temperature value over a maximum surface proportion of the measurement object.

The active catalyst core 22, which is located in a not shown, tubular casing, comprises a roll of two differently designed sheet metal parts 23, 24, which in not shown manner are covered with a platinum-containing catalyst layer. In each case a substantially smooth sheet 23 and a corrugated sheet 24 are rolled together to form a cylindrical core, the channels 25 formed by the corrugated sheet forming the passage channels for the exhaust flowing perpendicular to the drawing plane out of an internal combustion engine. Thus, a very large active surface for catalytic afterburning is created.

The temperature sensor 11 is integrated into said core. It is located in a groove 28 stamped in the originally planar sheet 23 and is also slightly pressed into the neighbouring corrugation top 26 of the corrugated sheet 24. The temperature sensor 11 is connected in good heating conducting manner to the sheets 23, 24 by soldering 27, performed in vacuo during overall catalyst manufacture. As a function of the temperature sensor length, it can comprise one or more complete or partial windings or turns of the roll. In order to ensure that the temperature sensor is not too long in the case of a fully integral coverage in both the circumferential and diameter directions, the roll could also be produced in multiple form from several pairs of straight and corrugated metal sheets 23, 24. Other fitting methods, such as a diametral arrangement at right angles through the roll are possible.

The temperature sensor is supplied with a measurement current by a not shown measuring device. The electrical resistance of the resistance wire 18 substantially linearly changing with the temperature is measured by means of a corresponding measuring circuit, e.g. a measuring bridge and can be used for display or recording, but in particular for regulating or controlling a process. In the case of a catalytic converter for internal combustion engines the measurement result is used for electronic engine control, in order to reduce the exhaust values to a prescribed minimum and also produce an optimum process temperature in the catalytic converter. This takes place particularly well in the case of the temperature sensor according to the invention, because its output signal integrally covers or detects all the temperatures in its active area between the inner ends of the joining bolts 14, 19 and not only in a punctiform manner, which could lead to misinterpretations concerning the overall state of the measurement object.

FIG. 2 shows a temperature sensor 11, which is the same as that according to FIG. 1 as regards all details and use possibilities, with the exception of the connecting area 13. Over the connection-side end of the jacket 12 is shoved a sleeve 30, which can be made from the same material as the jacket 12, but has a much larger diameter and wall thickness and is tightly joined to said jacket 12 by soldering, welding or pressing. Prior to the engagement of the sleeve, the connect-side end of the jacket 12 is produced with the joining bolts 35. For this purpose the parts are placed in one half of a two-part ceramic body and are conductively connected by welding to the joining pins 14, 14'. Alternatively, a casting compound can be used in place of the ceramic body. It is also conceivable to fill the sleeve partly with oxide ceramic powder, e.g. the same material as the embedding medium 17 and this is subsequently consolidated by a pressing operation.

FIG. 5 shows a construction in which the temperature sensor is integrated into a metal sheet 23, which can be part of the measurement object and in particular the uncorrugated sheet of a catalytic converter 21. To said sheet are fitted by means of two longitudinally welded seams the lateral flanges 40 of an omega-shaped jacket portion 12a. In the latter are placed the resistance coil 18 and the embedding medium 17, either in the manner described hereinbefore, or by lateral filling or introduction into the omega-shaped jacket portion 12a. The corresponding compacting of the embedding medium can take place prior to the application to the metal sheet 23 and can optionally be completed thereafter. In this embodiment a flat oval construction is particularly appropriate and by pressing the coil cross-section can be shaped in accordance with the jacket cross-section. The heat coupling to the sheet 23 is of an optimum nature and there is no need for a separate jacket tube 12.

FIGS. 6 to 8 show different jacket constructions for the temperature sensor and are in the form of sheet metal pockets or parts. In FIG. 6 the jacket 12b is formed by a D-shaped depression on the edge of a metal sheet 41, the flange 40 being welded thereto. FIG. 7 shows a corresponding construction, in which the jacket 12c is bent from a metal sheet to a full circle, but is then welded together along parallel, laterally projecting flanges 42. Finally, FIG. 8 shows a construction in which the jacket 12d is formed from two identical, omega-shaped sheet metal parts with a semicircular depression.

We claim:

1. Electric resistance temperature sensor comprising an electrically conductive material jacket containing a resistance wire embedded in an embedding medium in electrically insulating manner, the embedding medium being made from compacted bulk material; the resistance wire containing a noble metal with a positive temperature coefficient; the embedding medium being a mixture containing a reversible oxygen-yielding insulating material and another electrically insulating material.

2. Temperature sensor according to claim 1, wherein the resistance wire consists of an alloy containing the noble metal.

3. Temperature sensor according to claim 1, wherein the noble metal is platinum.

4. Temperature sensor according to claim 1, wherein the reversible oxygen-yielding insulating material is cerium dioxide ($CeO_2$).

5. Temperature sensor according to claim 1, wherein said another electrically insulating material is an oxide of a group of oxides containing magnesium oxide and aluminium oxide.

6. Temperature sensor according to claim 1, wherein the mixture contains 5% to 35% cerium dioxide as said oxygen-yielding insulating material.

7. Temperature sensor according to claim 1, wherein the reversible oxygen-yielding insulating material consists of particles, particle size between 2 to 5 $\mu$m.

8. Temperature sensor according to claim 1, wherein said another insulating material consists of particles of a particle size between 2 to 100 $\mu$m.

9. Temperature sensor according to claim 1, wherein the jacket comprises a tube of iron-chromium-aluminium alloy.

10. Temperature sensor according to claim 9, wherein the jacket is a longitudinally seam welded, drawn tube, which contains 20 to 25% chromium, 4 to 6% aluminium, the remainder an element of the group of elements containing iron, yttrium, silicon, manganese, nickel, titanium and zirconium.

11. Temperature sensor according to claim 1, wherein the resistance wire has a spiral construction.

12. Temperature sensor according to claim 1, wherein the resistance wire is fitted to at least one joining bolt, which is made from the same material as, and fastened to, the jacket.

13. Temperature sensor according to claim 1, wherein the resistance wire is on one side internally electrically connected to the jacket.

14. Temperature sensor according to claim 1, wherein the resistance wire is fitted to at least one joining bolt, the joining bolt being surrounded by inlet insulator means in the form of a ceramic bead of oxide ceramic.

15. Temperature sensor according to claim 1, wherein the resistance wire is fitted to at least one joining bolt, the joining bolt being fastened in the jacket by inlet insulator means comprising solder and an insulating material.

16. Temperature sensor according to claim 1, further comprising inlet insulator means comprising a sleeve larger in diameter than the jacket, which is tightly connected to the jacket and partly filled with a second embedding medium, which is less compacted than the embedding medium in the jacket.

17. Temperature sensor according to claim 1, wherein the jacket is a tube with a diameter below 1.5 mm, its length is over 200 mm, whereof the active length of said resistance wire is at least 100 mm.

18. Temperature sensor according to claim 1, wherein the jacket has a hardness between 160 and 350 HV, and a yield strength is between 600 and 900N/mm$^2$.

* * * * *